US00RE37988E

(19) United States
(12) Reissued Patent
Uss

(10) Patent Number: US RE37,988 E
(45) Date of Reissued Patent: Feb. 18, 2003

(54) COOKWARE TOP

(75) Inventor: Tom Uss, Fairfax, VA (US)

(73) Assignee: Newell Operating Company, Freeport, IL (US)

(21) Appl. No.: 09/604,832

(22) Filed: Jun. 27, 2000

Related U.S. Patent Documents

Reissue of:
(64) Patent No.: 5,771,783
Issued: Jun. 30, 1998
Appl. No.: 08/532,328
Filed: Sep. 22, 1995

(51) Int. Cl.[7] ..... A47J 36/06
(52) U.S. Cl. ..... 99/343; 99/337; 16/110.1; 16/433; 16/111.1; 220/912; 374/141; 374/149; 374/155
(58) Field of Search ..... 16/110.1, 111.1, 16/406, 422, 118; 220/367.1, 912; 99/337, 343, 344; 374/141, 149, 155; 137/551; D7/393, 397

(56) References Cited

U.S. PATENT DOCUMENTS

| | | | | |
|---|---|---|---|---|
| 2,154,426 | A | * | 4/1939 | Adams |
| 2,254,570 | A | | 9/1941 | Hailey |
| 4,509,550 | A | | 4/1985 | Monk |
| 4,575,262 | A | | 3/1986 | Anderson |
| 4,677,964 | A | | 7/1987 | Lohmeyer et al. |
| 4,690,095 | A | | 9/1987 | Walls et al. |
| 4,747,712 | A | | 5/1988 | Gonoh et al. |
| 4,776,296 | A | | 10/1988 | Heermans |
| 5,203,465 | A | | 4/1993 | Baumgarten |
| 5,320,137 | A | | 6/1994 | Huang |
| 5,323,692 | A | | 6/1994 | Grzywna |

FOREIGN PATENT DOCUMENTS

| | | | |
|---|---|---|---|
| CH | 273673 | | 3/1949 |
| DE | 1888353 | | 2/1964 |
| DE | 7133687 | | 9/1971 |
| DE | 8115361 | | 5/1981 |
| DE | 3436884 | A1 | 10/1984 |
| DE | 8419665 | | 10/1985 |
| EP | 0381250 | | 1/1986 |
| EP | 0262716 | | 9/1987 |
| WO | WO 82/03543 | | 10/1982 |
| WO | WO 92/00033 | * | 1/1992 |

OTHER PUBLICATIONS

Royal Prestige Brochure for Health Systems, "caring about . . . the food you eat . . . the water you drink . . . the air you breathe . . . the lifestyle you live . . . ," pp. 1–8.

* cited by examiner

*Primary Examiner*—Anthony Knight
*Assistant Examiner*—Enoch E Peavey
(74) *Attorney, Agent, or Firm*—Foley & Lardner

(57) ABSTRACT

A cookware lid having a *handle* where the handle supports a thermometer having a meat probe and an aperture to cause a whistling sound to warn that the internal temperature of a container has reached 180 degrees, eliminating possible carcinogens, *e. Coli* bacterium, salmonella and the like.

64 Claims, 2 Drawing Sheets

(AMENDED)

FIG. 1
(AMENDED)
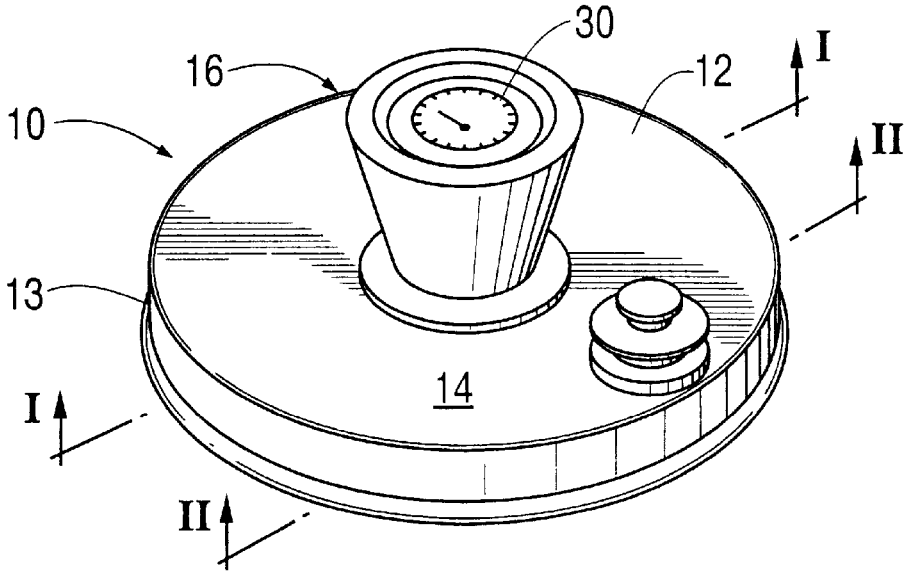

FIG. 4
(AMENDED)
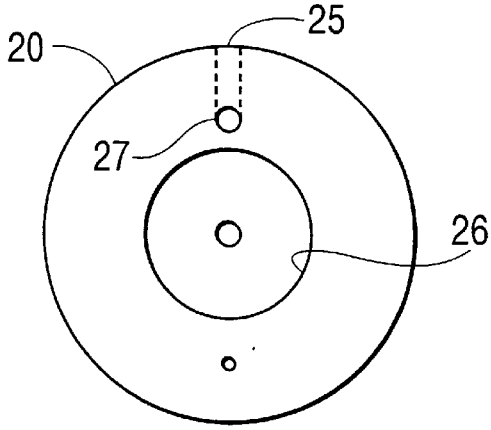
FIG. 7
(AMENDED)
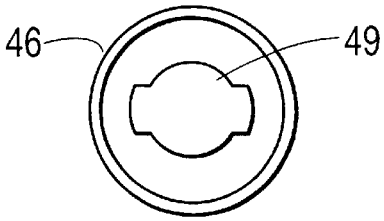
FIG. 8
(AMENDED)
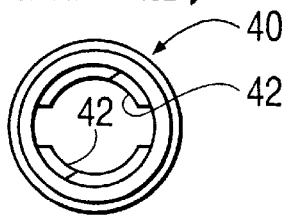

COOKWARE TOP

Matter enclosed in heavy brackets [ ] appears in the original patent but forms no part of this reissue specification; matter printed in italics indicates the additions made by reissue.

BACKGROUND OF THE INVENTION

The present invention is directed to a new and improved cook top for eliminating the possible formation of carcinogenic chemicals, the *e. Coli* bacterium, salmonella and all other types of micro-organisms hazardous to one's health. These dangerous carcinogenic chemicals or *e. Coli* bacterium are all formed from either cooking food, in particular red meats, at high temperatures or undercooking which causes the *e. Coli* bacterium and others. So the threat of food contamination is present every instant when humans handle food.

In the last 20 years, the National Cancer Institute has been investigating the effects of broiling, smoking and frying meats. The findings revealed that during cooking, heterocyclic aromatic amines (HAAs) are formed at high temperatures. However, meats cooked at lower temperatures form negligible amounts of HAA's.

An article found in "*The Food Pharmacy*" by Sean Cayser, published May 1991, titled "Healthier Barbecue" is directed to reducing heterocyclic amines in cooked meats. One suggested solution is to pre-cook meats, such as microwaving, poaching. stewing or roasting and then grilling the partially cooked meats. Another is to add soybean protein which blocks 95 percent of the HAA's in ground meat. Studies also suggest drinking tea and eating garlic will block HAA chemicals.

Another problem associated with red meats is the *e. Coli* bacterium. This particular bacterium is carried in the intestines of animals. It enters the human system via undercooked beef. The presently accepted method to prevent *e. Coli* bacterium is to thoroughly cook meat to kill all micro-organisms. One suggested method is to cook meats at a temperature of 180 degrees, as set forth in Congressional amendment #1504, proposed Rule 60 February 1995, Federal Register 6774, Jun. 12, 1995.

There is, as can be understood, two opposing situations: first, meats should not be cooked at high temperatures, and second, meats should not be undercooked. The solution is all meats should be completely cooked at a temperature that is neither too high of too low. The United States Department of Agriculture published a bulletin titled, "Use of a Meat Thermometer" which recommends the use of a thermometer to control cooking meat at a temperature between 140 degrees and 180 degrees. In spite of this recommendation, it still is not common practice to use meat thermometers. The present invention provides a solution for cooking meats. Specifically, a cookware top is provided with a thermometer supporting handle for measuring the internal temperature of food as they cook. The handle also has an audible whistle to provide notification of a given temperature, and enables the cook to adjust heat to desired level.

The center for disease control in a survey started in 1973 and concluded in 1989, determined that 97 percent of all deaths and illnesses due to pathogenic causes were the result of incorrect food preparation by the consumer, not unsafe or unsanitary conditions during processing at the packing plant. This is stated in the congressional record of 1995 at page 9768.

Many *e. Coli* poisoning cases, especially children, do not survive the infection. Four million are made ill, at a cost of about four billion dollars a year, one to four billion dollars a year could be saved by preventing *e. Coli*, Salmonella and other food borne illnesses.

DESCRIPTION OF THE DRAWINGS

FIG. 1 is a perspective view of a cookware lid in accordance with the present invention.

FIG. 4 is a bottom view of a handle of the present handle.

FIG. 7 is a bottom view of a nut used with the pressure whistle of FIG. 5.

FIG. 8 is a bottom view of the ferrule of the pressure whistle of FIG. 5.

SUMMARY OF THE INVENTION

Figure 2:
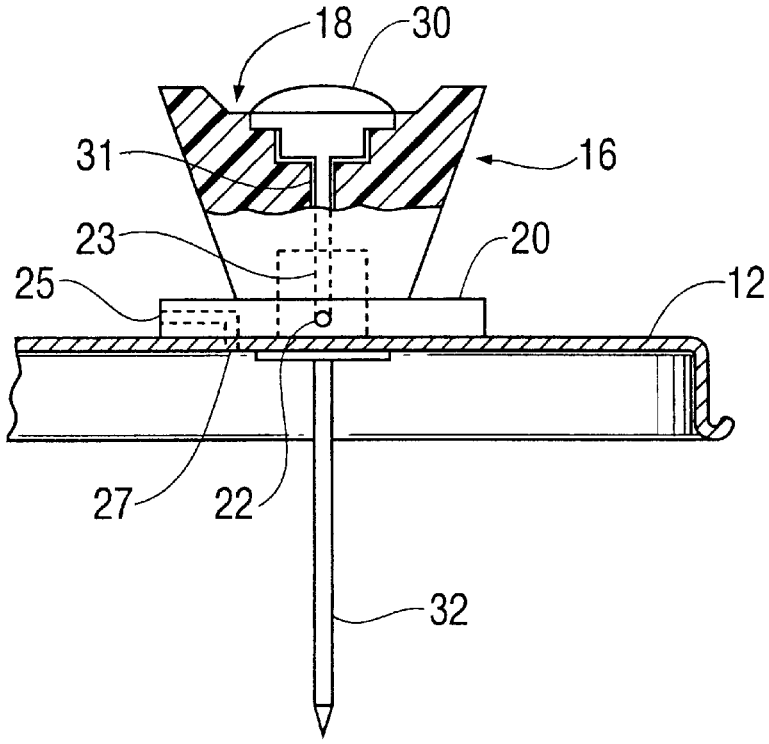
FIG. 2 is a partial cross-section taken along the line [2—2 ] *I—I* of FIG. 1
Figure 3:
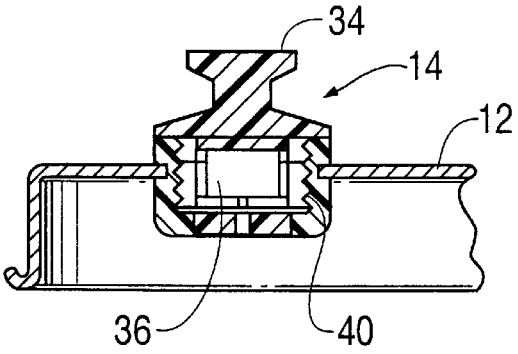
FIG. 3 is a partial cross-section taken along the line [3—3 ] *II—II* of FIG. 1.
Figure 5:
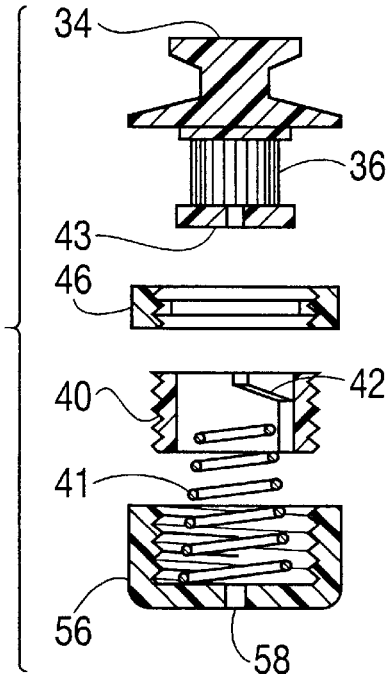
FIG. 5 is a view of a pressure whistle used in a cookware lid of the invention.

The present invention relates to cookware lids and, in particular, to a cookware lid having a handle with a thermometer for measuring the internal temperature of cooking food. Regardless of material or method, the thermometer functions independently thereof.

A cookware lid of a size to form a relatively tight seal with a cookware pot so that steam or moisture can build up in the cookware to create a pressure that will activate a pressure whistle in the lid A handle is attached to the lid by a threaded screw with an aperture in the center. There is a molded cavity in the handle to support a removable thermometer. An aperture in the handle aligns with the aperture in the threaded screw where the thermometer has a probe which extends through the two apertures. The length of the probe is such as to penetrate half way into a food, such as meat, potato, and the like.

The handle has a base with a small aperture which extends from the bottom of the base to an exterior edge. The aperture opening in the bottom of the base aligns with an aperture in the cookware lid. The aperture provides a pressure release causing a whistling sound when the temperature reaches 180 degrees.

It has been found that when foods, in particular, meats, reach a center temperature of 180 degrees, they are completely cooked, eliminating dangerous HAA's, *e.Coli* micro-organisms, and the like.

DESCRIPTION OF THE INVENTION

Referring to the drawings, FIGS. 1–8 there is shown, a cookware handle 16 of the present invention. In FIG. 1, a cookware lid 10 is shown having a disk shape 12 and a downwardly projecting skirt 13. There is an aperture, not shown, in the center of disk shape 12 through which a threaded screw 22 extends. The threaded screw 22 has an aperture 23. Threaded on the threaded screw 22 is handle 16, the handle has molded internal threads (not shown) in cavity 26 to the mate with the threaded screw 22. The handle shown has a frusto-conical shape with a large disk shaped bottom 20. Disk shaped bottom 20 has an aperture 25 which extends to the edge of the disk shaped bottom 20 and to an opening 27 in the face of bottom 20. The lid 12 has an opening (not shown) which aligns with opening 27 so that as the temperature rises in a cookware, pressure builds and escapes through aperture 25. Ordinarily, this occurs when the temperature of the inside of the container reaches 180 degrees. When the pressure is sufficient. air rushes through the aperture 25 causing a whistling sound. The cook [than] *then* can adjust heat to [hot ] *hold* food temperatures.

The top 18 of the handle 16 is [convexed] *concave* and shaped to support a removable thermometer 30. To assist the consumer in properly cooking the food, a chart is incorporated on the handle to give specific temperatures for specific foods. There is an aperture 31 which aligns with aperture 23 in threaded screw 22. Thermometer 30 has a dial face, not shown, and a probe 32 which is long enough to penetrate to the center of a piece of meat, potato, of the like. When the pressure causing a whistling through aperture 25, it alarms a person that the temperature of the inside of the container, etc. is about 180 degrees.

Figure 6:
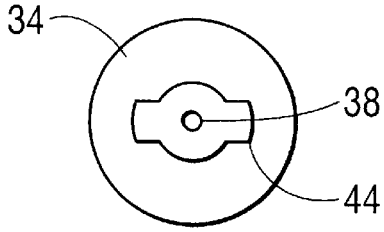
FIG. 6 is a bottom view of a whistle moving part used with the pressure whistle of FIG. 5.

A second whistle 14 may be provided in lid 10 which has an aperture, not shown, for mounting the whistle 14. There is a reciprocating piece 34 which has a through opening defined by walls 36. Piece 34 has tabs 44 and an opening 38. FIG. 6. A ferrule 40 has screw threads on the outside and a bore 49, FIG. 7, with a cam surface 42. A nut 46 secures the ferrule 40 on top of the lid and a nut 56 secures the ferrule 40 in the inside of the lid. Nut 56 has an opening 58, which will be explained later. Piece 34 is designed to rotate and reciprocate in ferrule 40. Tabs 44 ride on cams 42 to either lock the piece 34 shut or to open it, allowing the piece 34 to reciprocate. Steam or air pressure passes through openings 58 and 38 to lift piece 34 to allow the steam or air to escape, causing a whistling sound A coil spring 41, is disposed beneath bottom section 43 of piece 34 and keeps said piece 34 in an extended position except, when it is rotated and locked in it's lower position after the whistle blows to cut off the whistle.

In use, the cookware cover 10 is placed on a pot containing meat, potatoes, etc. The thermometer probe 32 pierces the food so as to read the internal temperature of the food. As the temperature in the pot rises, pressure whistle 14 sounds at or above 180 degrees. Similarly, handle 20 whistles through aperture 25. The whistle or whistles are operational, and act to sound an alarm to warn that the internal temperature of the container has reached 180 degrees, a temperature where HAA's chemicals and *e.Coli* bacterium are not produced in sufficient enough amount to cause harm.

I claim:

1. A cookware lid comprising a handle knob having a base and an upstanding handle portion, a first aperture extending through said handle portion and said base, means to mount said handle knob to said cookware lid, said base having a second aperture mating with an aperture in said cookware lid where pressure built during the heating of a cookware will cause a whistling sound through said second aperture, said handle portion having a top surface with a molded depression receiving a thermometer having a probe which extends through said first aperture and an aligned opening in said cookware lid, said thermometer probe extends into a cookware to penetrate half way into a piece of food, where the internal temperature of the food is measured.

2. A cookware lid as in claim 1 wherein said means to mount said handle knob to said cookware lid is a threaded screw which screws into said knob.

3. A cookware lid as in claim 2 wherein a second pressure whistle is mounted on the cookware lid, said pressure whistle having a cam locked reciprocating air release member, where rotating said air release member in one direction locks said air release member against opening and rotating in the opposite direction releases said air release member to allow said air release member to reciprocate to release air, causing a second whistling sound.

*4. Cooking method comprising:*

*placing a cookware top according to claim 1 on a cookware vessel that contains food;*

*piercing said food within said cookware vessel with said thermometer probe to measure internal temperature of said food.*

*5. A cookware top comprising:*

*a lid,*

*a handle mounted to said lid,*

*an aperture extending through said handle,*

*said handle supporting a thermometer with a probe which extends through said aperture and an aligned opening in said lid, said thermometer being insertable through and removable from said lid during cooking.*

*6. A cookware top according to claim 5, wherein said aperture extends through a base portion of said handle.*

*7. A cookware top according to claim 5, wherein said thermometer is supported by a molded depression on a top surface of said handle.*

*8. A cookware top according to claim 5, wherein said handle is mounted to said lid with a threaded screw that screws into said handle.*

*9. A cookware top according to claim 5, wherein said handle includes a second aperture that causes a whistling sound in response to passage of air through said second aperture.*

*10. A cookware top according, to claim 5, wherein said thermometer probe has a length sufficient to penetrate food that is in a cookware vessel upon which said lid is placed.*

*11. A cookware top according to claim 5, further comprising a pressure whistle mounted to said lid.*

*12. Cookware comprising:*

*a cookware vessel; and*

*a cookware top according to claim 5;*

*wherein said thermometer robe extends into said cookware vessel to measure internal temperature of food within said cookware vessel.*

*13. Cooking method comprising:*

*placing a cookware top according to claim 5, on a cookware vessel that contains food;*

*piercing said food within said cookware vessel with said thermometer probe to measure internal temperature of said food.*

*14. A cookware top according to claim 5, wherein said thermometer is adapted to be moveable relative to said lid so as to pierce food with said probe to measure internal temperature of said food.*

*15. A cookware top according to claim 5, wherein said handle is mounted to said lid with a threaded screw, and wherein said thermometer is supported by a molded depression on a top surface of said handle.*

*16. A cookware top according to claim 15, wherein said handle includes a second aperture that causes a whistling sound in response to passage of air through said second aperture.*

*17. A cookware top comprising a handle knob, mounted to a lid, having a base and an upstanding handle portion, a first aperture extending through said handle portion and said base, said base having a second aperture mating with an aperture in said lid where pressure built during heating of a cookware vessel will cause a whistling sound through said*

*second aperture, said handle portion having a top surface with a molded depression receiving a thermometer having a probe which extends through said first aperture and an aligned opening in said lid, said thermometer probe extends into said cookware vessel to penetrate half way into a piece of food, where internal temperature of said food is measured.*

*18. A cookware top according to claim 17, wherein said handle knob is mounted to said lid with a threaded screw that screws into said knob.*

*19. Cookware comprising:*

*a cookware vessel; and*

*a cookware top according to claim 17;*

*wherein said thermometer robe extends into said cookware vessel to measure internal temperature of food within said cookware vessel.*

*20. Cooking method comprising:*

*placing a cookware top according to claim 17, on a cookware vessel that contains food;*

*piercing said food within the cookware vessel with the thermometer probe to measure internal temperature of said food.*

*21. A cookware top comprising a handle knob having a base and an upstanding handle portion, an aperture extending through said handle portion and said base, means to mount said handle knob to a lid, said handle portion having a top surface with a molded depression receiving a thermometer having a probe which extends through said aperture and an aligned opening in said lid, said thermometer adapted to be moveable relative to said lid so as to pierce food with said probe to measure internal temperature of said food.*

*22. A cookware top according to claim 21, wherein said base has a second aperture that causes a whistling sound in response to said passage of air through said second aperture.*

*23. Cookware comprising:*

*a cookware vessel; and*

*a cookware top according to claim 21,*

*wherein said thermometer probe extends into said cookware vessel to measure internal temperature of food within said cookware vessel.*

*24. Cooking method comprising:*

*placing a cookware top according to claim 21, on a cookware vessel that contains food;*

*piercing said food within said cookware vessel with said thermometer probe to measure internal temperature of said food.*

*25. A cookware top comprising a handle knob mounted to a lid, said handle knob having a base and an upstanding handle portion, an aperture extending through said handle portion and said base, said handle portion having a top surface with a molded depression receiving a thermometer having a probe which extends through said aperture and an aligned opening in said lid, said thermometer adapted to be moveable relative to said lid so as to pierce food with said probe to measure internal temperature of said food.*

*26. A cookware top according to claim 25, wherein said base has a second aperture that causes a whistling sound in response to passage of air through said second aperture.*

*27. A cookware top according to claim 25, wherein said handle knob is mounted to said lid with a threaded screw that screws into said knob.*

*28. A cookware top according to claim 27, wherein said handle knob includes a second aperture that causes a whistling sound in response to passage of air through said second aperture.*

*29. Cookware comprising:*

*a cookware vessel; and*

*a cookware top according to claim 25,*

*wherein said thermometer probe extends into said cookware vessel to measure internal temperature of food within said cookware vessel.*

*30. Cooking method comprising:*

*placing a cookware top according to claim 25, on a cookware vessel that contains food;*

*piercing said food within the cookware vessel with the thermometer probe to measure internal temperature of said food.*

*31. A cookware top comprising, a handle knob mounted to a lid, said handle knob having a base and an upstanding handle portion, an aperture extending through said handle portion and said base, said handle portion having a top surface with a molded depression receiving, a thermometer having a probe that is extendable through said aperture and an aligned opening in said lid, said thermometer being slidably removable from said lid.*

*32. A cookware top according to claim 31, wherein said handle knob is mounted to said lid with a threaded screw.*

*33. Cooking method comprising:*

*placing said cookware top according to claim 31, on a cookware vessel that contains food;*

*piercing said food within said cookware vessel with said thermometer probe to measure internal temperature of said food.*

*34. A cookware top according to claim 38, wherein said pressure whistle has a cam locked reciprocating air release member, where rotating said air release member in one direction locks said air release member against opening and rotating in an opposite direction releases said air release member to allow said air release member to reciprocate to release air, causing a whistling sound.*

*35. A cookware top according to claim 32, wherein said handle knob includes a second aperture that causes a whistling sound in response to passage of air through said second aperture.*

*36. A cookware top according to claim 31, wherein said thermometer probe has a length sufficient to penetrate food that is in a cookware vessel upon which said lid is placed.*

*37. Cookware comprising:*

*a cookware vessel: and*

*a cookware top according to claim 31;*

*wherein said thermometer probe extends into said cookware vessel to measure internal temperature of food within said cookware vessel.*

*38. A cookware top according to claim 32, wherein a pressure whistle is mounted to said lid.*

*39. A cookware top comprising a lid and a handle mounted to said lid, an aperture extending through said handle, said handle supporting a thermometer having a probe which extends through said aperture and an aligned opening in said lid, said thermometer adapted to be moveable relative to said lid so as to pierce food with said probe to measure internal temperature of said food.*

*40. A cookware top according to claim 39, wherein said top surface of said handle includes a molded depression that receives said thermometer.*

*41. A cookware top according to claim 39, wherein said handle is mounted to said lid with a fastener.*

*42. A cookware top according to claim 41, wherein said fastener is a threaded screw.*

*43. A cookware top according to claim 39, further comprising a pressure whistle mounted to said lid.*

*44. Cookware comprising:*

*a cookware vessel; and*

*a cookware top according to claim 39;*

*wherein said thermometer probe extends into said cookware vessel to measure internal temperature of food within said cookware vessel.*

*45. Cooking method comprising:*

*placing said cookware top according to claim 39 on a cookware vessel that contains food;*

*piercing said food within said cookware vessel with said thermometer probe to measure internal temperature of said food.*

*46. A cookware top comprising a handle mounted to a lid, an aperture extending through said handle, said handle supporting a thermometer having a probe that is extendable through said aperture and an aligned opening in said lid, said thermometer being slidably removable from said lid.*

*47. A cookware top according to claim 46. wherein a top surface of said handle includes a molded depression that receives said thermometer.*

*48. A cookware top according to claim 46, wherein said handle is mounted to said lid with a fastener.*

*49. A cookware top according to claim 48, wherein said fastener is a threaded screw.*

*50. A cookware top according to claim 46. further comprising a pressure whistle mounted to said lid.*

*51. Cookware comprising:*

*a cookware vessel: and*

*a cookware top according to claim 46;*

*wherein said thermometer probe extends into said cookware vessel to measure internal temperature of food within said cookware vessel.*

*52. Cooking method comprising:* placing a cookware top according to claim 46 on a cookware vessel that contains food;

piercing said food within said cookware vessel with said thermometer probe to measure internal temperature of said food.

*53. A cookware top comprising:*

*a lid,*

*a handle,*

*means for mounting said handle to said lid,*

*an aperture extending through said handle,*

*a thermometer with a probe which extends through said aperture and an aligned opening in said lid, said thermometer being insertable through and removable from said lid during cooking, and*

*a pressure whistle mounted to said lid;*

*wherein said handle includes a depression to support said thermometer.*

*54. A cookware top according claim 53, wherein said handle is mounted to said lid with a threaded screw.*

*55. A cookware top according to claim 53, wherein said pressure whistle comprises a second aperture in said handle that causes a whistling sound in response to passage of air through said second aperture.*

*56. A cookware top according to claim 53, wherein said thermometer probe has a length sufficient to penetrate food that is in a cookware vessel upon which said lid is placed.*

*57. Cookware comprising:*

*a cookware vessel; and*

*a cookware top according to claim 53;*

*wherein said thermometer probe extends into said cookware vessel to measure internal temperature of food within said cookware vessel.*

*58. Cooking method comprising:*

*placing a cookware top according to claim 53 on a cookware vessel that contains food;*

*piercing said food within said cookware vessel with said thermometer probe to measure internal temperature of said food.*

*59. A cookware top comprising a lid, a handle knob, means to mount said handle knob to said lid, and a pressure whistle mounted to said lid, said handle knob having a base and an upstanding handle portion, an aperture extending through said handle portion and said base, said handle portion having a top surface with a molded depression receiving a thermometer having a probe that is extendable through said aperture and an aligned opening in said lid, said thermometer being slidably removable from said lid.*

*60. A cookware top according to claim 59, wherein said handle knob is mounted to said lid with a threaded screw.*

*61. A cookware top according to claim 59, wherein said pressure whistle comprises a second aperture in said handle knob that causes a whistling sound in response to passage of air through said second aperture.*

*62. A cookware top according to claim 59, wherein said thermometer probe has a length sufficient to penetrate food that is in a cookware vessel upon which said lid is placed.*

*63. Cookware comprising:*

*a cookware vessel; and*

*a cookware top according to claim 59;*

*wherein said thermometer probe extends into said cookware vessel to measure internal temperature of food within said cookware vessel.*

*64. Cooking method comprising:*

*placing a cookware top according to claim 59 on a cookware vessel that contains food;*

*piercing said food within said cookware vessel with said thermometer probe to measure internal temperature of the food.*

* * * * *